United States Patent [19]

Jantzen

[11] 3,794,265

[45] Feb. 26, 1974

[54] REEL CLAMP

[75] Inventor: Johannes K. Jantzen, Mountain View, Calif.

[73] Assignee: International Video Corporation, Sunnyvale, Calif.

[22] Filed: Oct. 24, 1972

[21] Appl. No.: 299,817

[52] U.S. Cl. .............................. 242/68.3, 287/53 H

[51] Int. Cl. .............................................. B65h 17/02

[58] Field of Search .................... 242/46–46.2, 68.3, 242/68.1; 287/53 R, 53 H; 279/119–121; 269/47, 52

[56] References Cited

UNITED STATES PATENTS

| | | | |
|---|---|---|---|
| 3,053,466 | 9/1962 | Rehklau | 242/68.3 |
| 3,140,061 | 7/1964 | Benson | 242/68.1 |
| 3,278,134 | 10/1966 | Cochrane | 242/68.3 |
| 3,532,286 | 10/1970 | Mallette | 242/68.3 |

*Primary Examiner*—Leonard D. Christian

*Attorney, Agent, or Firm*—Limbach, Limbach & Sutton

[57] ABSTRACT

A tape reel clamp which securely and accurately holds a tape reel on a spindle, the reel clamp having a finger lever linked to a wedge member which is slidably engagable with a pair of retractable fingers. The fingers are extendable over a tape reel hub mounted on the spindle, the pressure exerted on the hub being determined by a spring bias, the spring bias being opposed by said lever when retracting said fingers.

7 Claims, 6 Drawing Figures

REEL CLAMP

BACKGROUND OF THE INVENTION

This invention relates to devices employed to secure a reel to a rotating spindle or turntable and has particular application in securing a magnetic tape reel on a recorder, computer or the like where a high degree of accuracy is required in aligning the reel with respect to the axis of rotation.

Since tape systems such as computers and recorders, particularly video recorders, frequently utilize large heavy reels of wide magnetic tape for multichannel recording, accurate alignment is necessary for both mechanical stability and controlled feeding of the tape in the systems. However, in obtaining the objective of accurate alignment, the unavoidable burden of changing tape reels should not be compounded by complicated or difficult means of securing the reel to the system.

Tape reels for such systems generally have large spaced flanges of plastic or metal fixed to a central hub having a wide mounting hole. The reels are mounted on a correspondingly wide spindle and seated on a relatively small concentric turntable which generally supports the reel at the hub. A variety of different devices are employed to secure the reel to the spindle or hold the reel down on the turntable. For example, the reel hub may be keyed to the spindle by one or more splines. Or more advantageously, the reel hub may be maintained against a high friction surface on the turntable by a clamping means thereby dispensing with orientation problems in placement of a reel on a keyed device.

Devices employing clamping means generally are of two types, rotational and lever. The former means may employ a knob or cap on the spindle which when twisted or rotated outwardly cams lateral projections on the sides of the spindle which engage the top of the reel hub and maintain the hub on the turntable. The latter means may employ a lever connected to similar cammed projections or be linked to such projections directly to maintain the hub on the turntable.

The former means suffers the disadvantage of requiring additional locking structure to prevent rotation of the spindle when twisting the cap or knob. The latter means while avoiding this disadvantage, generally is difficult to operate, requiring a degree of force which is taxing to certain operators.

The present invention utilizes the basic advantages of the latter means, but employs a lever mechanism which substantially reduces the operating forces required.

SUMMARY OF THE INVENTION

The invention comprises a lever operated hold-down and locking mechanism for a wide tape reel spindle. While the invention may be employed to clamp other reel type or web carrying devices to a rotatable support, or for that matter to clamp any variety of first members to a second member, the description will be directed to a mechanism for clamping a magnetic tape reel to a turntable.

The lever operated hold down and locking mechanism, or clamping mechanism, is integral with a wide spindle having a narrow turntable flange at the spindle base for support of a tape reel. Essentially a pair of clamping fingers having chamfered ends are extendible laterally from the side of the spindle and engage the top surface of a tape reel hub adjacent the spindle. The wedge action of the protruding chamfered ends of the fingers against the hub forces the hub down against the turntable flange. The friction between the turntable flange and the hub prevents the tape reel from slipping when spindle and flange are rotated.

The invented clamping mechanism comprises a lever linked to a wedge member. The wedge member engages the extendible clamping fingers opposite the protruding chamfered ends. However, rather than engage the opposite face to the chamfered end on each finger, the wedge member engages what is arbitrarily termed a concomitant face to the chamfered end, i.e., a cam surface substantially facing the same direction as the chamfered end of the finger. The concomitant face is formed in an aperture on each finger, but may also be formed by tabs on the finger or notches in the sides of the finger. The wedge member slidably engages the concomitant face of the fingers and extends and retracts the fingers when lowered or raised by the linked lever.

The mechanical ease in operating the clamping mechanism is obtained by the arrangement of biasing springs in combination with the inverted arrangement of the wedge member. The wedge member is spring biased to raise, thus assisting in withdrawing the clamping fingers. The fingers on the other hand are biased to extend, thus assisting in lowering the wedge member. Therefore, rather than being cumulative, requiring a face on the lever necessary to counteract both a spring bias on the wedge member plus a spring bias on the fingers, the spring biases are subtractive requiring an operating force which is the difference of the effective spring biases for the respective elements. Additionally, by spring biasing the extension of the fingers a substantially equal clamping force will be transmitted to tape reels having different hub thicknesses within a defined range of tolerances.

The preferred embodiment of this invention is shown in drawings and described in greater detail in the remaining specification.

DETAILED DESCRIPTION OF THE PREFERRED EMBODIMENT

Figures 1, 3:
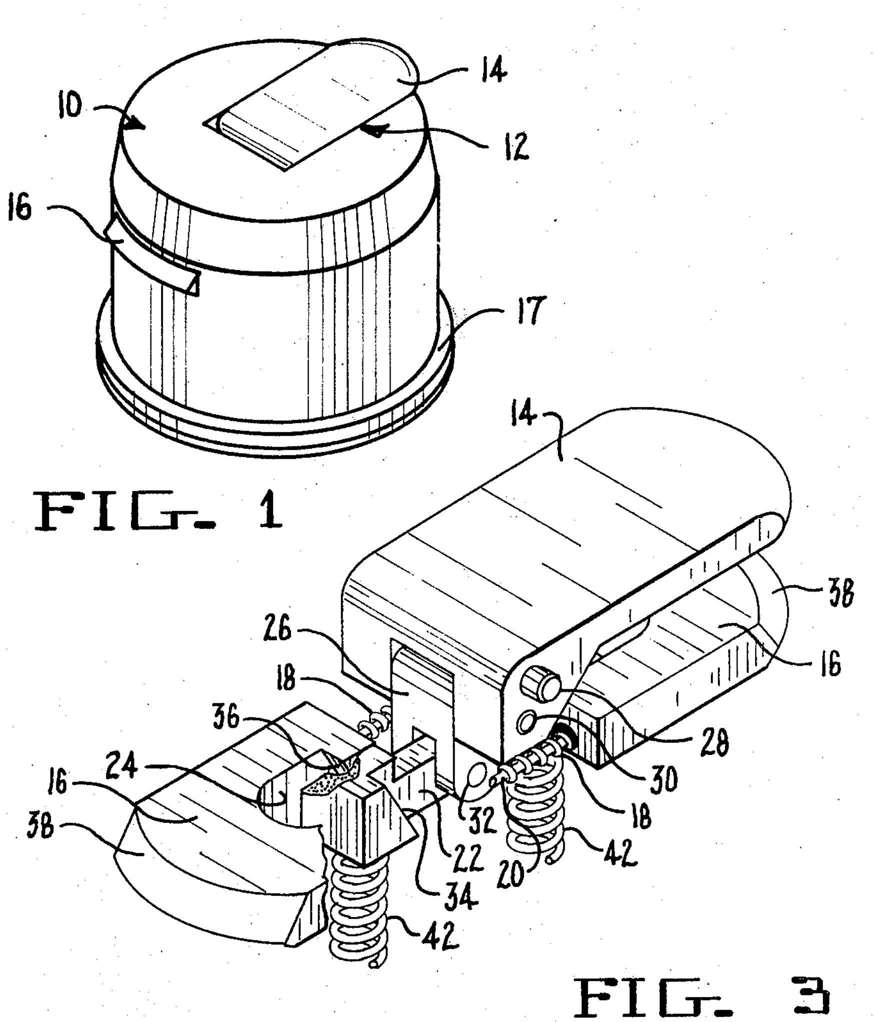
FIG. 1 is a perspective view of a spindle and clamping mechanism.
FIG. 3 is a perspective view of a portion of the clamping mechanism separated from the spindle for schematic illustration.

Referring to the drawings and in particular to FIG. 1, a spindle 10 having a tape reel clamping mechanism 12 is shown. A lever 14 pivotally mounted to the top of the spindle 10 is in operating connection with two fingers 16 oppositely located on each side of the spindle 10. At the base of the spindle is a narrow flange 17 for support of a magnetic tape reel or the like. When a tape reel is clamped to the flange, the spindle, tape reel and flange are rotatable concurrently.

Figure 2:
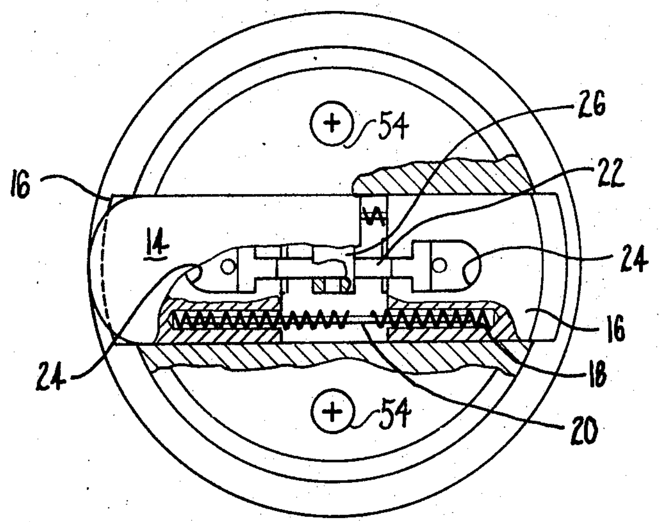
FIG. 2 is a plan view, partially in section of the spindle and clamping mechanism.

The fragmentary sectional view of FIG. 2 illustrates the arrangement of extendible fingers 16. The fingers 16 are mounted within the spindle on a horizontal plane and extend or retract from the peripheral surface of the spindle on a common axis. Two elongated springs 18 interconnect the two opposed fingers 16 and provide a separating bias to the fingers. Lateral rigidity to the springs is maintained by support rods 20, retained within the coils of the springs. The two spring biased fingers are restrained from unrestricted separation by a wedge member 22 which effectively hooks into a notched aperture 24 in each finger engaging the fingers in mutual restraint. A link 26 pivotally connected to the wedge element links the wedge element to the lever 14.

The operation of basic elements of the clamping mechanism can most clearly be determined from the schematic illustration of FIG. 3. In FIG. 3 the major portion of the clamping mechanism is shown removed from its supporting structure in the spindle.

The force required to lift the lever 14 is amplified by the advantage of the short distance between the lever pivot at pin 28 and the link connection at pin 30, over the long distance between the lever pivot and the distal end of the lever. The rotational movement of the lever 14 is translated to a vertical linear movement of the wedge member by the connecting link 26 at pin 32. In order to convert the vertical linear movement of the wedge member to a usable horizontal linear movement at the fingers, a tandem cam arrangement is employed. The wedge member 22 has opposing sloped faces 34 which slidably engage complementary sloped faced 36 on the fingers 16. While the conversion of vertical linear movement to horizontal linear movement may be accomplished without mechanical advantage by a 45° sloping of the cam surfaces, the preferred embodiment includes a force advantage translated to the fingers by the 30° sloping of the cam surfaces from the vertical.

Essentially the wedge member acts not as a traditional wedge, but rather as what may be termed an inverted wedge since the cam surfaces of the wedge member face one another in a concave or intrados rather than convex or extrados manner. It is therefore necessary that the cam surface on each finger not be opposing but what is arbitrarily termed concomitant to the chamfered end 38 of the fingers, i.e., facing away from one another in the same manner as the chamfered ends 38 of the fingers. In the primary operating direction the wedge member draws the fingers together rather than separates them apart as in the operation of a traditional wedge.

In the preferred embodiment the concomitant sloping faces 36 on the fingers are formed in a notched aperture 24 in each finger. The aperture 24 allows the opposing sloping face 34 at each end of the wedge member to engage the respective sloping face on the finger, and draw the fingers together against the bias of the elongated springs 18 when the wedge member is raised.

Extension of the fingers is accomplished by action of the elongated springs (one shown in FIG.3) which force the fingers apart. This extension is limited by the wedge member which permits maximum extension when at its lowest position. To compensate for the bias of the elongated springs, which impede raising but facilitate lowering of the wedge member, a vertical assist spring 42 is located under each end of the wedge member. In this manner the operating force is proportional to the difference between the springs separating the fingers and the springs raising the wedge member.

Figures 4, 5:
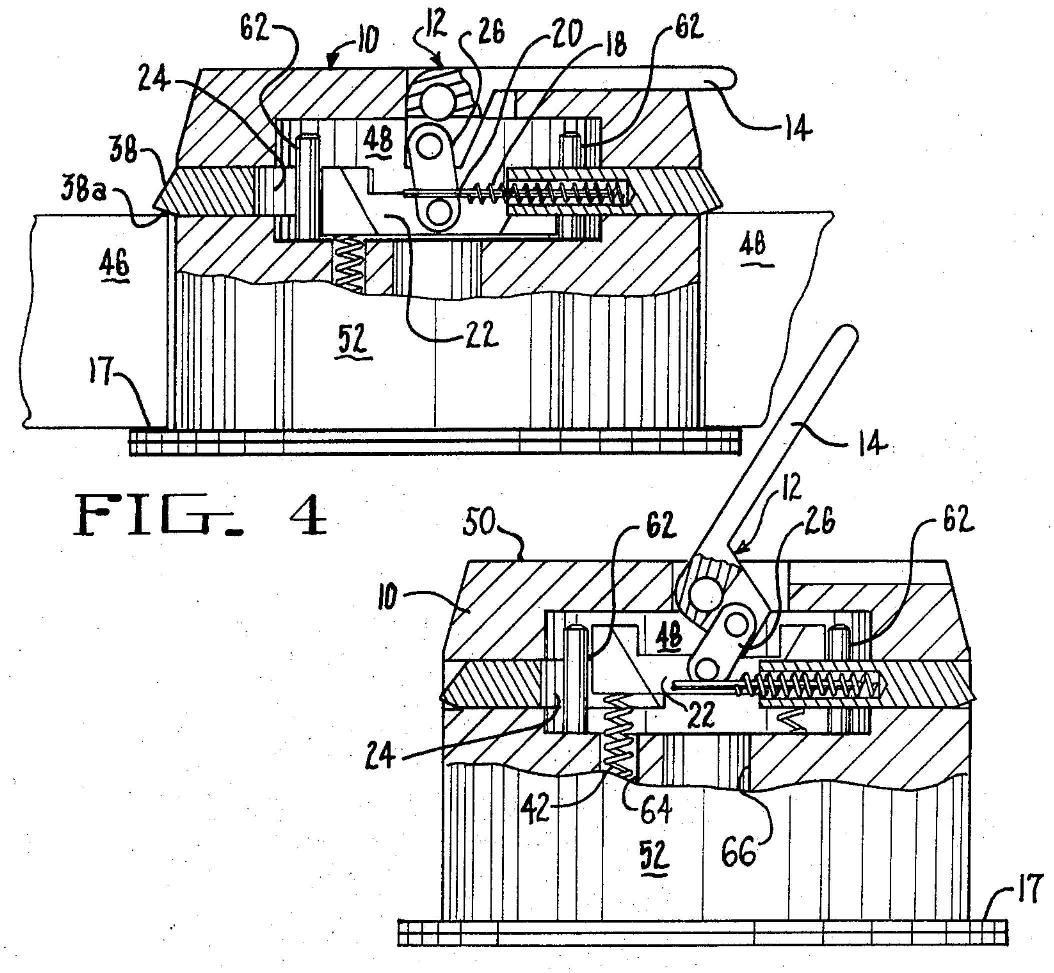
FIG. 4 is an elevational view partially in section of the spindle and clamping mechanism in clamp position.
FIG. 5 is an elevational view similar to FIG. 4 in release position.

Referring to FIGS. 4 and 5, the respective extended and retracted positions of the fingers are shown. In FIG. 4 the lever 14 has been pressed to a down or clamping position seated flush with the top of the spindle 10. The lever 14 remains in the down position because the connecting link 26 has gone over center such that the vertical assist springs generate an angular moment on the lever in the down direction. In this position the fingers are extended by the total force of the elongated springs 18 because the cam faces 34 and 36 do not contact at the extreme down position. Additionally, in this position the lever 14 has its greatest mechanical advantage requiring little force to lift or depress the lever.

The projecting chamfered ends 38 of the fingers engage a tape reel hub 6 seated on the flange 17 at the base of the spindle 10. The chamfered face 38*a* provides a high vertical clamping force to be exerted on the hub and yet permits compensation for fabrication tolerances. In this manner substantially the same clamping force is exerted on all reels within a relatively wide range of thickness tolerances and the force is directly proportional to the compression force of the elongated springs.

In FIG. 5 the lever 14 has been flipped to an up or release position. The lever 14 is held in the up position by vertical assist springs 42 because of a slightly higher relative force in this position. The lever 14 draws the link 26 and connected wedge member 22 upwardly, forcing the fingers to retract by the cam action of the sloping faces 34 and 36 on wedge member 22 and fingers 16 shown in FIG. 3. When retracted, the fingers are withdrawn within the periphery of the spindle permitting a reel hub 46 to be placed on or removed from the spindle.

Figure 6:
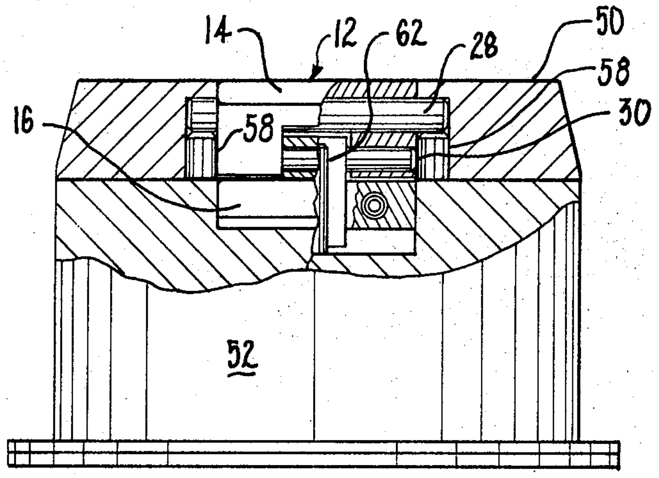
FIG. 6 is a front elevational view partially in section of the spindle and clamping mechanism.

The arrangement of the clamping mechanism 12 within the supporting structure in the spindle 10 is shown in FIGS. 4, 5 and 6. The clamping mechanism 12 is in large part contained within a cavity 48 within the spindle. The spindle is formed in two segments, a cap 50 and a column 52, which are secured together by screws 54 shown in FIG. 2. The pivot pin 28 of the lever 14 is seated in a chanel 56 within the cap 48 and maintained in position by seating pins 58 as shown in FIG. 6.

The formation of the spindle cap 50 permits the lever to extend through the cap and lie flush with the top of the spindle in clamping position. In this position the lever extends beyond the peripheral edge of the spindle cap in order to allow an adequate finger grip under the lever for lifting. The spindle cap in combination with the spindle column provides opposed guide channels through which the fingers are extendible. Additional guides in the form of pins 62 are mounted in the column and project through the notched aperture 24 of the fingers adjacent the ends of the wedge member when raised or lowered by the lever. Between the guide pins 62 are a pair of holes 64 (one shown in FIG. 5) which provide a seating cavity for the vertical assist springs 42 for the wedge member. And lastly, centrally located within the spindle column is a bore 6 in which a drive shaft of a drive motor (not shown) is insertable for driving the spindle and tape reel clamped thereon.

I claim:

1. A clamping mechanism for releasably holding a member on a spindle comprising:

a. a vertically displaceable wedge member operatively connected to the spindle having at least one cam surface, b. at least one horizontally retractable finger having a cam surface slidably engageable with a cam surface of said wedge member, c. biasing means for pressure biasing said cam surface of said finger against a cam surface of the wedge member, and d. means for vertically displacing said wedge member and by cam action of said cam surfaces causing said finger to be retracted against said biasing means.

2. The clamping mechanism of claim 1 wherein said means comprises a lever and a link, said link connecting said lever and said wedge member.

3. The clamping mechanism of claim 1 wherein said biasing means comprises an elongated spring.

4. A clamping mechanism for releasably holding a reel on a spindle comprising a. a vertically displaceable wedge member operatively connected to the spindle having facing cam surfaces, b. a pair of horizontally opposed fingers having ends extendible from the spindle and cam surfaces concomitant with the ends of the fingers, said cam surfaces slidably engagable with the cam surfaces of the wedge member, c. biasing means for separating said fingers and maintaining said cam surfaces of said fingers against said cam surfaces of said wedge member, and d. means for vertically displacing said wedge member.

5. The clamping mechanism of claim 4 wherein said means for vertically displacing said wedge member comprises further, a lever pivotally connected to said spindle and a link connecting said lever to said wedge member.

6. The clamping mechanism of claim 4 wherein said biasing means comprises a pair of elongated parallel springs between said horizontally opposed fingers.

7. The clamping mechanism of claim 4 wherein said ends of said fingers, extendible from the spindle, are chamfered to compensate for variations in the thickness of a reel held on the spindle.

* * * * *